(12) United States Patent
Powell

(10) Patent No.: US 10,556,647 B2
(45) Date of Patent: Feb. 11, 2020

(54) FOAMLESS SURFBOARD

(71) Applicant: Jim Powell, Mt. Dora, FL (US)

(72) Inventor: Jim Powell, Mt. Dora, FL (US)

(*) Notice: Subject to any disclaimer, the term of this patent is extended or adjusted under 35 U.S.C. 154(b) by 0 days.

(21) Appl. No.: 16/019,657

(22) Filed: Jun. 27, 2018

(65) Prior Publication Data

US 2020/0001952 A1   Jan. 2, 2020

(51) Int. Cl.
  *B63B 35/79*   (2006.01)

(52) U.S. Cl.
  CPC ...... *B63B 35/7909* (2013.01); *C08L 2201/06* (2013.01)

(58) Field of Classification Search
  CPC . B63B 35/7909; B63B 35/7906; B63B 35/79; C08L 2201/06
  USPC ........................................................ 441/74, 79
  See application file for complete search history.

(56) References Cited

U.S. PATENT DOCUMENTS

| | | | | |
|---|---|---|---|---|
| 5,295,883 | A * | 3/1994 | Moran | B63B 35/7906 114/357 |
| 9,701,370 | B2 * | 7/2017 | Walker | B63B 35/7909 |
| 2004/0235372 | A1 * | 11/2004 | Shaw | B63B 35/7933 441/74 |
| 2009/0181586 | A1 * | 7/2009 | Wagner, Jr. | B29C 33/308 441/74 |

\* cited by examiner

*Primary Examiner* — Anthony D. Wiest
(74) *Attorney, Agent, or Firm* — Kelly G. Swartz; Widerman Malek, PL

(57) ABSTRACT

A board including a plurality of elongate members and first and second non-permeable first fiber reinforced material layers. Each of the plurality of elongate members are cooperatively positioned to form a perimeter of a polygon. The non-permeable first fiber reinforced material layer is secured to a top surface of the perimeter of the polygon. The non-permeable second fiber reinforced material layer is secured to a bottom surface opposing the top surface of the perimeter of the polygon. A void is defined within the perimeter of the polygon between the first fiber reinforced material layer and the second fiber reinforced material layer.

19 Claims, 4 Drawing Sheets

FOAMLESS SURFBOARD

FIELD OF THE INVENTION

The present invention relates to systems and methods for foamless, see-through board construction. More specifically, the present invention relates to a foamless, see-through surfboard or paddleboard with a honeycomb structure interior encased in fiberglass and a method for making same.

BACKGROUND

Surfing, paddleboarding, and other watersports requiring buoyant boards remain popular recreational activities. Most existing boards used for these activities are constructed with a foam core, which may be surrounded by a more durable material, such as fiberglass or epoxy, to create a finished product. The foam core provides buoyancy and structural support for the surrounding material. Unfortunately, the foam used in these products is non-biodegradable and not environmentally friendly. Athletes participating in these activities desire to protect the environment and support the sustainability of our oceans and waterways by using Earth friendly products. Additionally, athletes using these boards desire an aesthetically pleasing design, such as a see-through board, No inexpensive, biodegradable, environmentally friendly, see-through board construction alternative is currently known This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a board including a plurality of elongate members and first and second non-permeable fiber reinforced material layers. Each of the plurality of elongate members may be cooperatively positioned to form a perimeter of a polygon. The non-permeable first fiber reinforced material layer may secure to a top surface of the perimeter of the polygon. The non-permeable second fiber reinforced material layer may secure to a bottom surface opposing the top surface of the perimeter of the polygon. A void may be defined within the perimeter of the polygon between the first fiber reinforced material layer and the second fiber reinforced material layer.

The polygon may be a hexagon. The plurality of elongate members may define a central void of the polygon.

The board may be buoyant.

Each of the plurality of elongate members may be cooperatively positioned to form a perimeter of a plurality of regular polygons.

The first and second non-permeable fiber reinforced material layers may comprise fiberglass.

Each of the plurality of elongate members may include first and second sides and first and second ends. The first side may have a first length. The second side, which opposes and is parallel to the first side, may have a second length less than the first length. The first end may connect the first side to the second side. The second end, which opposes the first end, may connect the first side to the second side. The angle formed between the first side and the first end may be equal to the angle formed between the first side and the second end. The angle formed between the second side and the first end may be equal to the angle formed between the second side and the second end.

The board may include a number of peripheral polygons equal to the number of sides of the polygon. Each of the peripheral polygons may be positioned around a central polygon. Each of the peripheral polygons and the central polygon may have the same number of sides, One side of each of the peripheral polygons may abut a side of the central polygon. Two sides of each of the peripheral polygons may abut an adjoining side of another of the peripheral polygons.

The board may include a fin carried by the second fiber reinforced material layer or a rigid, planar member carried by the first fiber reinforced material layer.

The board may include a plurality of polygons and a plurality of partial polygons. The plurality of polygons may abut one another and define an inner area. The plurality of partial polygons may surround the inner area and define an outer perimeter of the board.

The board may include a rigid, elongate member secured along the entirety of the outer perimeter of the board, a rigid, elongate member located on a top surface of the polygons along an outer perimeter of the board, and/or a rigid, elongate member located on a bottom surface of the polygons along an outer perimeter of the board.

DETAILED DESCRIPTION OF THE INVENTION

Figure 1:
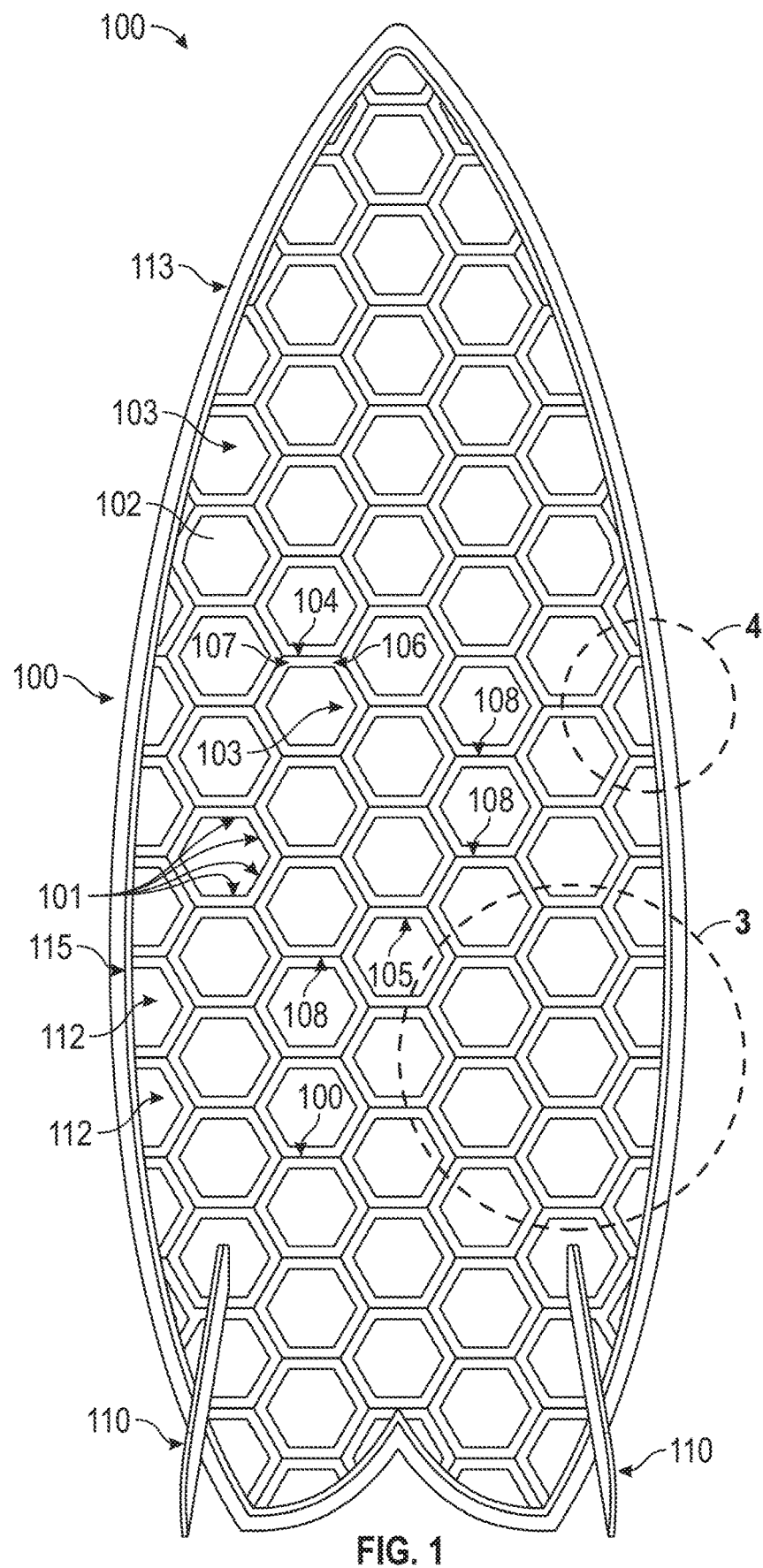
FIG. 1 is a bottom plan view of a board in accordance with an embodiment of the invention.
Figure 2:
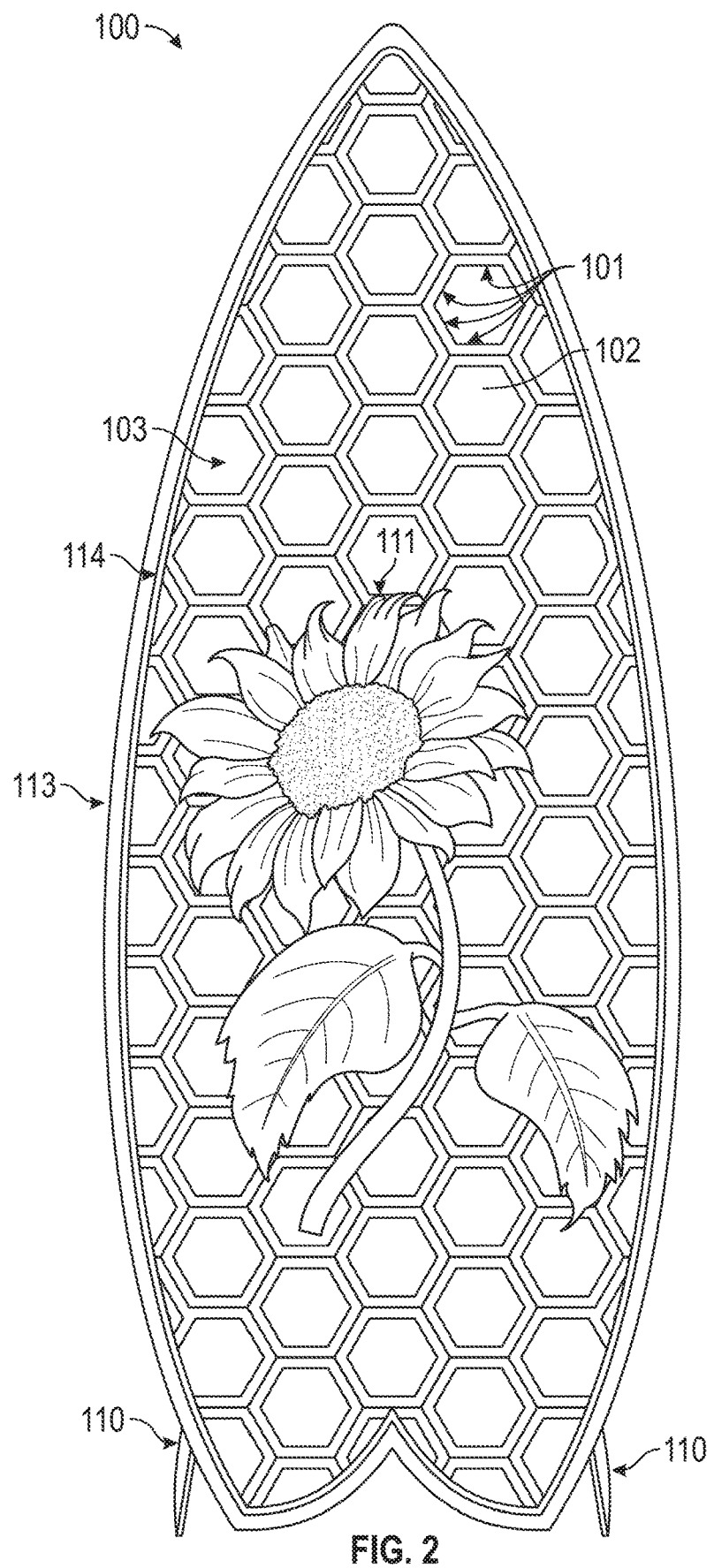
FIG. 2 is a top plan view of the board of FIG. 1.
Figure 3:
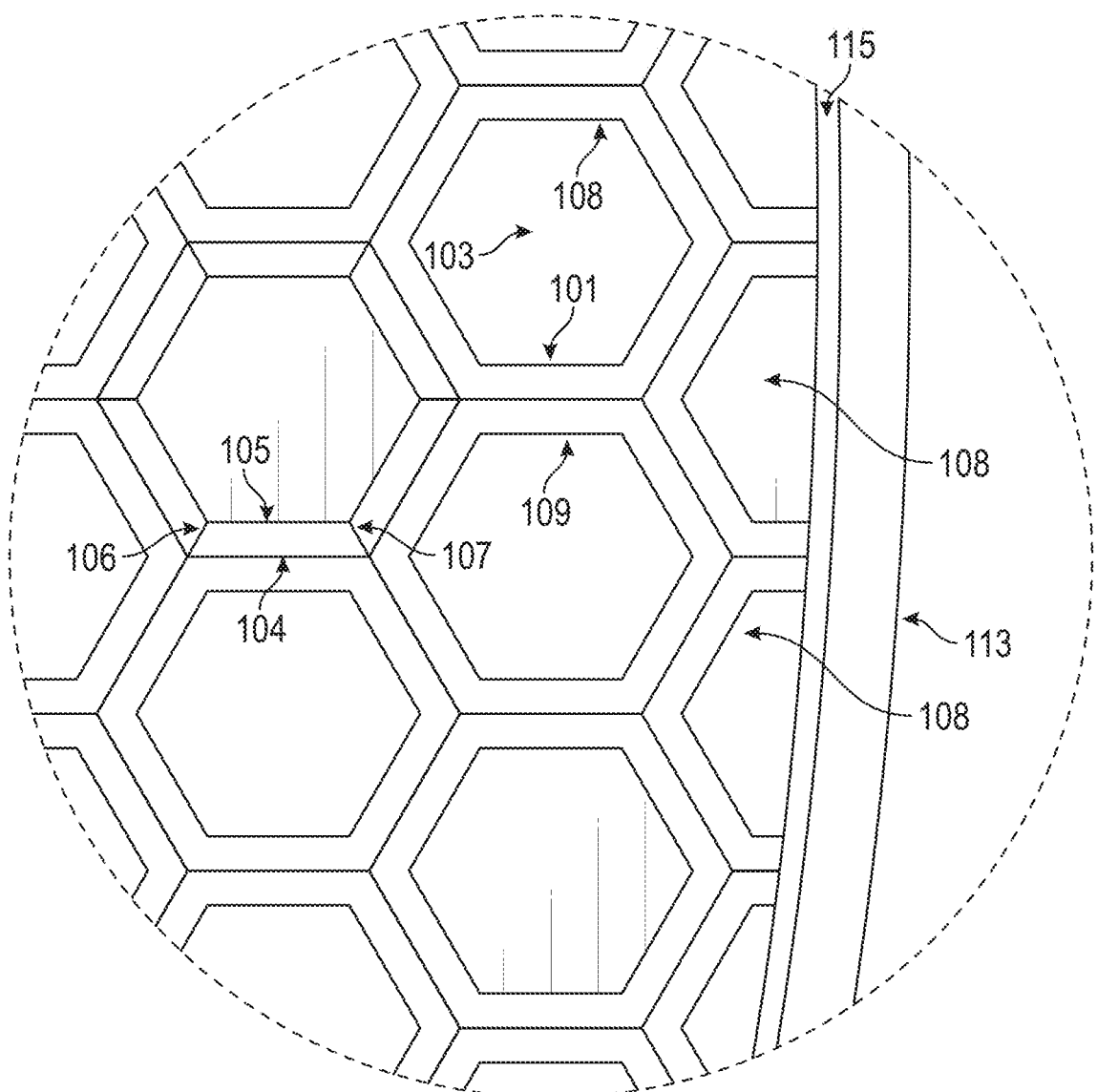
FIG. 3 is a close up view of the inset labeled 3 in FIG. 1.
Figure 4:
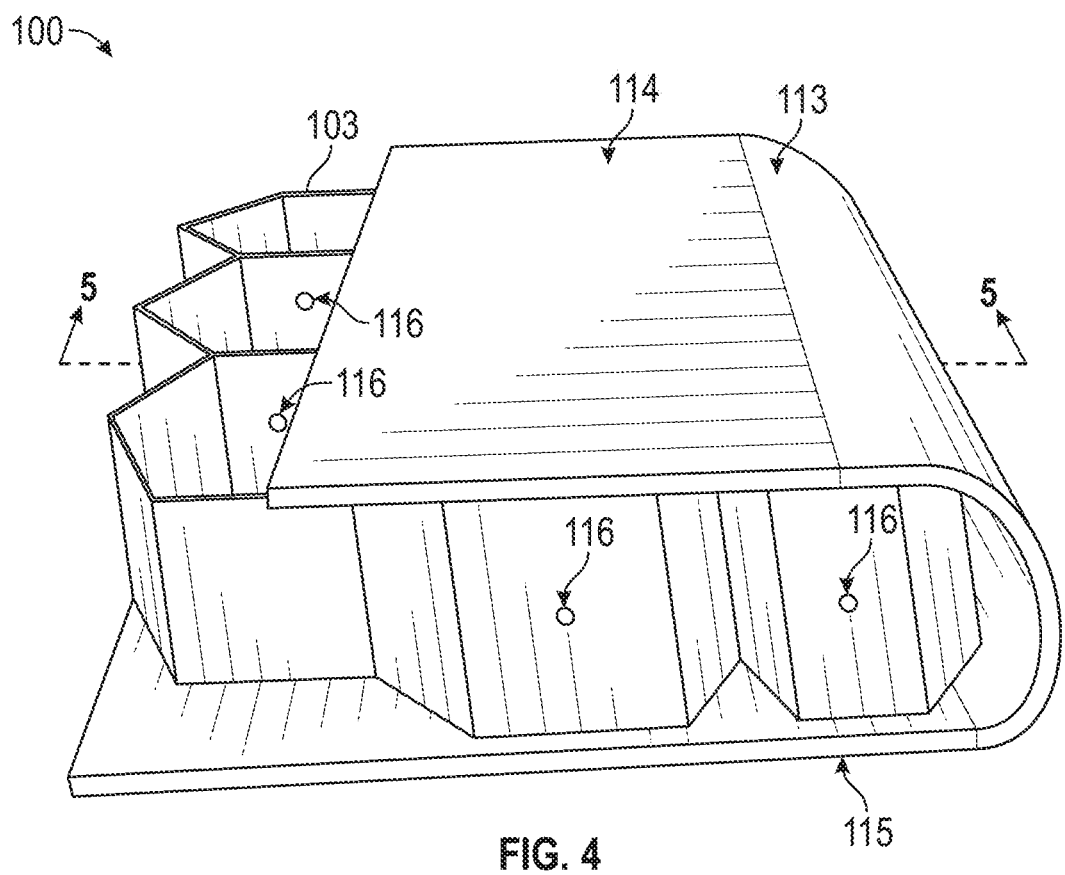
FIG. 4 is a perspective view of the inset labeled 4 in FIG. 1.
Figure 5:
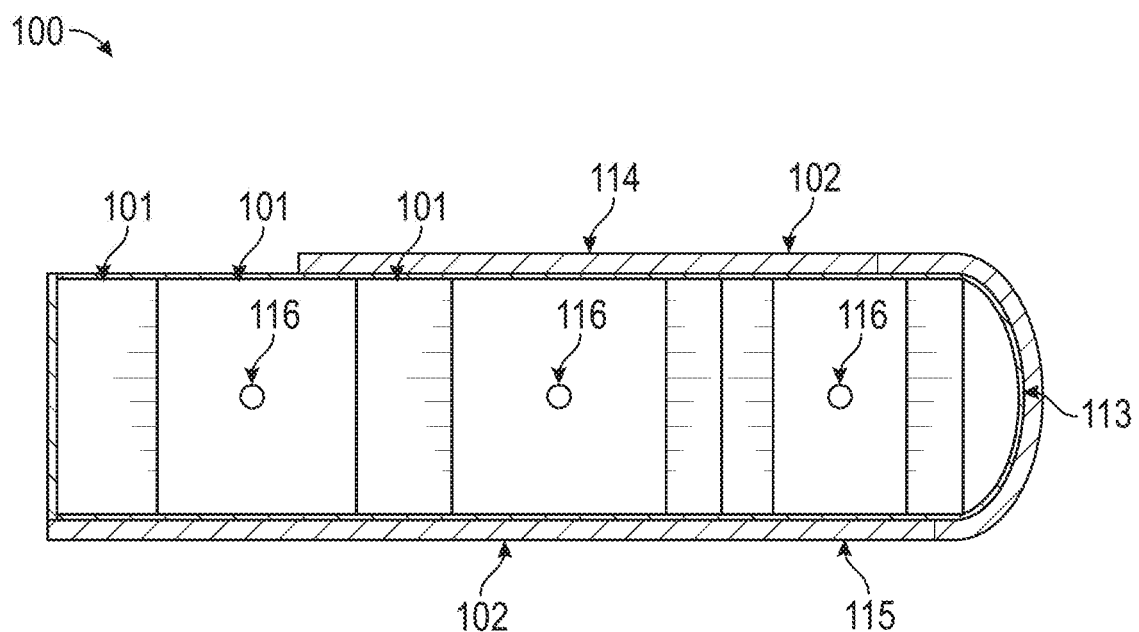
FIG. 5 is a side view of the section of the board depicted in FIG. 4.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a board 100, which may be a surfboard, paddleboard, wakeboard, other watersport board, or the like, including a plurality of elongate members 101, and first and second non-permeable fiber reinforced material layers 102.

Each of the plurality of elongate members 101 may be cooperatively positioned with each other to form a perimeter of a polygon. As depicted in the accompanying figures, the polygon may be a hexagon. However, one skilled in the art will appreciate that other polygons are anticipated and within the scope of this disclosure. The board 100 may include a plurality of polygons formed from the elongate members 101, which may be regular polygons. In one embodiment, regular hexagons may be formed by the elongate members 101.

Each elongate member 101 may have a first side 104, having a first length, and a second side 105, having a second length. The first side 104 and second sides 105 may oppose and be parallel to one another. The second length may be less than the first length. The midpoint of the second length may be aligned with the midpoint of the first length. Both a first end 106 and a second end 107 may connect the first side 104 to the second side 105. The first end 106 and second end 107 may oppose each other, but may not be parallel to one another. The angle formed between the first side 104 and the first end 106 may be equal to the angle formed between the first side 104 and the second end 107. Similarly, the angle formed between the second side 105 and the first end 106 may be equal to the angle formed between the second side 105 and the second end. When positioned to form the perimeter of a polygon, for each elongate member 101 in the polygon, the first end 106 of the elongate member 101 may lay flush against the second end 107 of the adjacent elongate member 101. Each elongate member 101 may be symmetrical about a transverse axis extending from a midpoint of the first length to a midpoint of the second length.

One or more of the elongate members 101 may have one or more channels 116 located through an entirety of the thickness of the elongate member 101, extending from the first side 104 to the second side 105 of the elongate member 101. The channels 116 may be located in the elongate members 101 to remove weight or to place the interior of each hexagon in fluid communication with the interior of one or more other hexagons in the hoard 100. Allowing fluid communication between the interiors of the hexagons may allow moisture which may inadvertently enter the board through a crack in the fiber reinforced material layer 102, to leave the interior of the board 100 through a single opening, which may be a leash plug, vent, or the like carried in a surface of the board 100.

The board may include a plurality of polygons formed by the elongate members 101. Each complete polygon may have the same number of sides as each other complete polygon in the board 100 and may have the same dimensions as each other complete polygon in the board 100. Every elongate member 101 used to create each complete polygon may have essentially identical dimensions. Due to the need for the board to have a smooth, elongated perimeter with a rounded nose and a slightly tapered tail, partial polygons 112 may surround a plurality of complete polygons and be located about the perimeter of the board 100. The plurality of complete polygons may define an inner area, while the plurality of partial polygons may surround the inner area entirely or partially and may define the outer perimeter of the board 100. Partial polygons may lack one or more angles or sides necessary to be a complete polygon because the desired perimeter shape of the board 100 requires portions of the elongate members 101 to be absent. However, in all other respects, the partial polygons may be comprised of elongate members 101 essentially identical to those found in complete polygons.

The board 100 structure may include one or more central polygons 109, about which a plurality of peripheral polygons 108 are positioned. Any polygon surrounded by a number of complete polygons equal to the number of sides of the polygon may be referred to as a central polygon 109. Any polygon immediately adjacent a central polygon 109 may be referred to as a peripheral polygon 108. A polygon may be both a central polygon 109 and a peripheral polygon 108. As depicted in the accompanying figures, the polygons may be hexagons. However, one skilled in the art will appreciate that the polygons may have other than six sides and a hexagon is used or exemplary purposes only. In embodiments utilizing hexagons, there may be six peripheral polygons 108 surrounding each central polygon 109. One side of each of the six peripheral polygons 108 may abut a side of the central polygon 109 along an entirety of the length of both abutting sides. The side of the peripheral polygon 108 abutting the central polygon 109 may be referred to as the center side. The two sides directly adjacent the center side may abut other peripheral polygons 108, which abut the same central polygon 109 along an entirety of the length of the abutting sides.

The elongate members 101 may be constructed from lightweight wood. The use of a lightweight wood may increase the buoyancy of the board 100 and produce a lightweight board 101 that is easy to transport and utilize, as well as providing an environmentally friendly, sustainable material for construction. In one embodiment, balsa, paulownia, or the like may be used. A bio-degradable plastic material may also be used to form the elongate members 101. In one embodiment, the elongate members 101 may be formed from a light weight, water-proof, bio-degradable substance using a 3-D printer. In such an embodiment, the elongate members 101 may be printed as a plurality of essentially identical components or may be printed as preformed interconnected polygons.

A first non-permeable fiber reinforced material layer 102 may be secured to the top surface of the perimeters of polygons formed by the elongate members 101. A second non-permeable fiber reinforce material layer 102 may be secured to the bottom surface of the perimeters of polygons formed by the elongate members 101. The first and second non-permeable fiber reinforced material layers 102 may be formed by applying non-permeable fiber reinforced material to the board 100 and allowing the material to cure. Those with skill in the art will appreciate that the non-permeable fiber reinforced material layers may be fiberglass, carbon fiber, or the like. In one embodiment, the fiber reinforced material layers may include a bio-degradable fiberglass resin. The material may be applied to cover, or encase, an entirety of the board 100 and may wrap from the front surface onto the back surface of the board 100. The non-permeable fiber reinforced material layers may be applied to the board prior to curing and may adhere to the board and to one another. The non-permeable fiber reinforced material layers may be rigid after curing.

The first fiber reinforced material layer 102, second fiber reinforced material layer 102, and the inner surface of the elongate members 101 forming the perimeter of a polygon may define a void 103. The void 103 may be filled by ambient air present during the construction of the board. This encased air may provide buoyancy to the board 100. The fiber reinforced material layer 102 may be non-permeable to prevent water or other liquids from entering the void 103 or being absorbed by the elongate members 101. The board 101 may be buoyant as a result of the displacement achieved by the voids 103 and the materials selected to form the elongate members 101 and the fiber reinforced material layers 102.

In some embodiments, one or more rigid, planar members 111 may be carried by the first fiber reinforced material layer 102. In such an embodiment, the one or more rigid, planar members 111 may be secured to the top surface of the board 100 using a fiber reinforced material layer, which may be the first fiber reinforced material layer 102. In one embodiment, the one or more rigid, planar members 111 may be secured directly to one or more elongate members 101 and the connection may be reinforced with one or more layers of a fiber reinforced material 102, which may be the first fiber reinforced material layer 102. The rigid, planar member 111 may provide a platform upon which a user of the board 100 may stand when using the board in the water. The rigid, planar member 111 may provide extra support to the fiber reinforced material layer 102, which may be beneficial to support the weight of a person riding the board 100. The rigid, planar member 111 may also provide ornamentation or customization to the board. The rigid, planar member 111 may be adapted to distribute the weight of a rider over a larger area than the weight would be distributed over if the rigid, planar member 111 was not present.

In some embodiments, one or more fins 110 may be carried by the second fiber reinforced material layer 102. In such an embodiment, the one or more fins 110 may be secured to the bottom surface of the board 100 using a fiber reinforced material layer. In one embodiment, the one or more fins 110 may be secured directly to one or more elongate members 101 and the connection may be reinforced with one or more layers of a fiber reinforced material 102, which may be the second fiber reinforced material layer 102, The fins 110 may be commercially available fins 110 of the kind known to those with skill in the art.

One or more leash plugs may be incorporated into the board 100. In such an embodiment, the leash plug may be carried by either the first or second fiber reinforced material layer 102.

A rigid, elongate member 113 may be secured along the entirety of the outer perimeter of the board 100 to form a rail. The rigid, elongate member 113 may be a single piece of wood, plastic, or the like. In another embodiment, the rigid, elongate member 113 may be formed from a plurality of pieces of wood, plastic, or the like. In one embodiment, the rigid, elongate member 113 may be formed from a lightweight, flexible piece of wood. The rigid, elongate member 113 may be positioned around the outer edges of the partial polygons 112 to define the perimeter of the board 100 and thereby, the rail of the board 100. The rigid, elongate member 113 may be secured to the partial polygons using adhesives or other fasteners, including the fiber reinforced material layer 102. The first and second fiber reinforced material layers 102 may overlap one another at the locations of the rigid, elongate member 113, One or both of the first and second fiber reinforced material layers 102 may cover an entirety of the rigid, elongate member 113.

Another rigid, elongate member 114 may be secured to the top surface of the polygons along an outer perimeter of the board 100. The rigid, elongate member 114 may be a single piece of wood, plastic, or the like. In another embodiment, the rigid, elongate member 114 may be formed from a plurality of pieces of wood, plastic, or the like. In one embodiment, the rigid, elongate member 114 may be formed from a lightweight, flexible piece of wood. The rigid, elongate member 114 may be positioned on the top surface of the partial polygons 112 around the outer perimeter of the board 100. The rigid, elongate member 114 may be secured to the partial polygons using adhesives or other fasteners, including the fiber reinforced material layer 102.

Another rigid, elongate member 115 may be secured to the bottom surface of the polygons along an outer perimeter of the board 100, The rigid, elongate member 115 may be a single piece of wood, plastic, or the like. In another embodiment, the rigid, elongate member 115 may be formed from a plurality of pieces of wood, plastic, or the like. In one embodiment, the rigid, elongate member 115 may be formed from a lightweight, flexible piece of wood. The rigid, elongate member 115 may be positioned on the bottom surface of the partial polygons 112 around the outer perimeter of the board 100. The rigid, elongate member 115 may be secured to the partial polygons using adhesives or other fasteners, including the fiber reinforced material layer 102.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc, are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A board comprising:
   a plurality of polygons positioned adjacent to one another, wherein each of the plurality of polygons comprises:
      a plurality of foamless elongate members, wherein each of the plurality of foamless elongate members are cooperatively positioned to form a perimeter of the polygon,
      a void defined by an inner side of each of the plurality of foamless elongate members, and
      a channel located through an entirety of a thickness of at least one of the plurality of foamless elongate members from an inner side to an opposing outer side, which channel places the void of the polygon adjacent the inner side of the foamless elongate member in fluid communication with the void of the polygon adjacent the outer side of the foamless elongate member;
   a non-permeable first fiber reinforced material layer secured to a top surface of the perimeter of each of the plurality of polygons; and
   a non-permeable second fiber reinforced material layer secured to a bottom surface opposing the top surface of the perimeter of the plurality of polygons.

2. The board according to claim 1 wherein the polygon is a hexagon.

3. The board according to claim 1 wherein the board is buoyant.

4. The board according to claim 1 wherein each of the plurality of polygons is a regular polygons.

5. The board according to claim 1 wherein the first fiber reinforced material layer comprises fiberglass and the second fiber reinforced material layer comprises fiberglass.

6. The board according to claim 1 wherein each of the plurality of foamless elongate members comprises:
   a first side having a first length;
   a second side, opposing and parallel to the first side, having a second length less than the first length;
   a first end connecting the first side to the second side; and
   a second end, opposing the first end and connecting the first side to the second side;
   wherein the angle formed between the first side and the first end is equal to the angle formed between the first side and the second end; and
   wherein the angle formed between the second side and the first end is equal to the angle formed between the second side and the second end.

7. The board according to claim 1 further comprising:
   a number of peripheral polygons equal to the number of sides of the polygon;
   wherein each of the peripheral polygons is positioned around a central polygon;
   wherein each of the peripheral polygons and the central polygon have the same number of sides;
   wherein one side of each of the peripheral polygons abuts a side of the central polygon;
   wherein two sides of each of the peripheral polygons abut an adjoining side of another of the peripheral polygons.

8. The board according to claim 7 further comprising:
   a rigid, planar member secured directly to the top surface of the perimeter of at least one of the central polygons by the first fiber reinforced material layer.

9. The board according to claim 1 further comprising:
   a fin carried by the second fiber reinforced material layer.

10. The board according to claim 1 further comprising:
    a plurality of partial polygons, wherein each of the plurality of partial polygons is adjacent one of the plurality of polygons and each of the plurality of partial polygons comprises:
       a plurality of foamless elongate members, wherein each of the plurality of foamless elongate members is cooperatively positioned to form a perimeter of a partial polygon;
    wherein the plurality of polygons define an inner area;
    wherein the plurality of partial polygons surround the inner area and define an outer perimeter of the board.

11. The board according to claim 10 further comprising:
    a rigid, elongate member secured along the entirety of the outer perimeter of the board by the first or second fiber reinforced material layer.

12. The board according to claim 10 further comprising:
    a rigid, elongate member secured directly to a top surface of the polygons only along an entirety of an outer perimeter of the board.

13. The board according to claim 12 further comprising:
    a rigid, elongate member secured directly to a bottom surface of the polygons only along an entirety of an outer perimeter of the board.

14. A board comprising:
    a plurality of polygons positioned adjacent to one another, wherein each of the plurality of polygons comprises:
       a plurality of foamless elongate members, wherein each of the plurality of foamless elongate members are cooperatively positioned to form a perimeter of the polygon,
       a void defined by an inner side of each of the plurality of foamless elongate members, and
       a channel located through an entirety of a thickness of at least one of the plurality of foamless elongate members from an inner side to an opposing outer side, which channel places the void of the polygon adjacent the inner side of the foamless elongate member in fluid communication with the void of the polygon adjacent the outer side of the foamless elongate member;
    wherein each of the plurality of foamless elongate members comprises:
       a first side having a first length,
       a second side, opposing and parallel to the first side, having a second length less than the first length,
       a first end connecting the first side to the second side,
       a second end, opposing the first end and connecting the first side to the second side,
       wherein the angle formed between the first side and the first end is equal to the angle formed between the first side and the second end, and
       wherein the angle formed between the second side and the first end is equal to the angle formed between the second side and the second end;
    a non-permeable first fiber reinforced material layer secured to a top surface of the perimeter of each of the plurality of polygons; and
    a non-permeable second fiber reinforced material layer secured to a bottom surface opposing the top surface of the perimeters of each of the plurality of polygons;
    a plurality of partial polygons, wherein each of the plurality of partial polygons is adjacent one of the plurality of polygons and each of the plurality of partial polygons comprises:

a plurality of foamless elongate members, wherein each of the plurality of foamless elongate members is cooperatively positioned to form a perimeter of a partial polygon:
wherein the plurality of polygons abut one another to form an inner area;
wherein a plurality of partial polygons surround the inner area and define an outer perimeter;
a rigid, elongate member secured along an entirety of the outer perimeter by the first or second fiber reinforced material layer; and
wherein the board is buoyant.

15. The board according to claim 14 further comprising six peripheral regular hexagons positioned around a central regular hexagon;
wherein one side of each of the six peripheral regular hexagons abuts a side of the central regular hexagon;
wherein two sides of each of the six peripheral regular hexagons abut an adjoining side of another of the six peripheral regular hexagons.

16. The board according to claim 14 further comprising:
a first rigid, elongate member secured directly to a top surface of the polygons only along an entirety of an outer perimeter of the board; and
a second rigid, elongate member secured directly to a bottom surface of the polygons only along an entirety of an outer perimeter of the board.

17. The board according to claim 14 further comprising:
a fin carried by the second fiber reinforced material layer.

18. The board according to claim 14 further comprising:
a rigid, planar member secured directly to the top surface of the perimeter of at least one of the central polygons by the first fiber reinforced material layer.

19. A board comprising:
a central hexagon;
six peripheral hexagons;
wherein each of the central hexagon and six peripheral hexagons comprise:
a plurality of foamless elongate members, wherein each of the plurality of foamless elongate members are cooperatively positioned to form a perimeter of the hexagon,
a void defined by an inner side of each of the plurality of foamless elongate member, and
a channel located through an entirety of a thickness of at least one of the plurality of foamless elongate members from an inner side to an opposing outer side, which channel places the void of the hexagon adjacent the inner side of the foamless elongate member in fluid communication with the void of the polygon adjacent the outer side of the foamless elongate member;
wherein each of the plurality of foamless elongate members comprises:

a first side having a first length,
a second side, opposing and parallel to the first side, having a second length less than the first length,
a first end connecting the first side to the second side,
a second end, opposing the first end and connecting the first side to the second side,
wherein the angle formed between the first side and the first end is equal to the angle formed between the first side and the second end, and
wherein the angle formed between the second side and the first end is equal to the angle formed between the second side and the second end;
a non-permeable first fiberglass layer secured to a top surface of the perimeter of each of the hexagons; and
a non-permeable second fiberglass layer secured to a bottom surface opposing the top surface of each of the perimeters of the hexagons;
wherein the central and peripheral hexagons abut one another and to form an inner area;
a plurality of partial hexagons, wherein each of the plurality of partial hexagons is adjacent one of the peripheral hexagons and each of the plurality of partial hexagons comprises:
a plurality of foamless elongate members, wherein each of the plurality of foamless elongate members is cooperatively positioned to form a perimeter of a partial hexagon;
wherein the plurality of partial hexagons surround the inner area and define an outer perimeter of the board;
a rigid, elongate member secured to the outer perimeter of the board b the first or second fiber reinforced material layer;
a first rigid, elongate member secured directly to a top surface of the hexagons only along an entirety of an outer perimeter of the board;
a second rigid, elongate member secured directly to a bottom surface of the hexagons only along an entirety of the outer perimeter of the board;
a fin carried by the second fiberglass layer; and
a rigid, planar member secured directly to the top surface of the perimeter of at least one of the central hexagons by the first fiberglass layer;
wherein a void is defined within the perimeter of the polygons between the first fiberglass layer and the second fiberglass layer;
wherein the board is buoyant;
wherein one side of each of the six peripheral regular hexagons abuts a side of the central regular hexagon;
wherein two sides of each of the six peripheral regular hexagons abut an adjoining side of another of the six peripheral regular hexagons.

* * * * *